(12) United States Patent
Duplys

(10) Patent No.: US 12,353,930 B2
(45) Date of Patent: Jul. 8, 2025

(54) APPLICATION PROGRAMMING INTERFACE SECURITY

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 379 days.

(21) Appl. No.: 17/812,475

(22) Filed: Jul. 14, 2022

(65) Prior Publication Data

US 2023/0161651 A1 May 25, 2023

(30) Foreign Application Priority Data

Nov. 22, 2021 (DE) ...................... 10 2021 213 115.8

(51) Int. Cl.
*G06F 9/54* (2006.01)
*G06F 21/55* (2013.01)

(52) U.S. Cl.
CPC ............ *G06F 9/547* (2013.01); *G06F 21/552* (2013.01); *G06F 21/554* (2013.01)

(58) Field of Classification Search
CPC ...... G06F 9/547; G06F 21/552; G06F 21/554; G06F 9/541; G06F 21/566
USPC .......................................................... 726/22
See application file for complete search history.

(56) References Cited

U.S. PATENT DOCUMENTS

| | | | |
|---|---|---|---|
| 7,013,326 B1* | 3/2006 | Suzuki | H04L 12/1813 709/224 |
| 10,873,601 B1* | 12/2020 | Stickle | H04L 63/1416 |
| 10,972,503 B1* | 4/2021 | Mohan | H04L 63/14 |
| 11,075,931 B1* | 7/2021 | Warren | H04L 63/1416 |
| 11,522,948 B1* | 12/2022 | Kairali | H04L 67/1012 |
| 2006/0010446 A1* | 1/2006 | Desai | G06F 9/4812 718/100 |
| 2018/0115523 A1* | 4/2018 | Subbarayan | G06N 20/00 |
| 2018/0196851 A1* | 7/2018 | Srivastava | G06F 9/54 |
| 2019/0095967 A1* | 3/2019 | Skulnik | H04L 67/02 |
| 2020/0005133 A1* | 1/2020 | Zhang | G06F 17/10 |
| 2020/0220875 A1* | 7/2020 | Harguindeguy | H04L 63/101 |
| 2020/0252429 A1* | 8/2020 | Vissamsetty | G06F 21/566 |
| 2021/0067553 A1* | 3/2021 | Ries | H04L 63/0263 |
| 2023/0161651 A1* | 5/2023 | Duplys | G06F 21/554 726/22 |
| 2023/0222473 A1* | 7/2023 | Mattier | G06F 9/541 705/16 |

* cited by examiner

*Primary Examiner* — Catherine Thiaw
*Assistant Examiner* — Nega Woldemariam
(74) *Attorney, Agent, or Firm* — NORTON ROSE FULBRIGHT US LLP

(57) ABSTRACT

A computer-implemented method for detecting anomalous activity in a computer system by monitoring at least one decoy application programming interface. The method includes: detecting, in at least one decoy API hosted in a computer system, a function call to the at least one decoy API from an element of the computer system; and transmitting an intrusion message from the at least one decoy API to an intrusion detection system signifying that a function call to the at least one decoy API has been made.

12 Claims, 2 Drawing Sheets

APPLICATION PROGRAMMING INTERFACE SECURITY

CROSS REFERENCE

The present application claims the benefit under 35 U.S.C. § 119 of German Patent Application No. DE 10 2021 213 115.8 filed on Nov. 22, 2021, which is expressly incorporated herein by reference in its entirety.

FIELD

This present invention relates to a computer-implemented method for detecting anomalous activity in a computer system by monitoring at least one decoy application programming interface (API), and an associated computer system, computer program element, and computer readable medium.

BACKGROUND INFORMATION

Application Programming Interfaces (APIs) are software interfaces capable of enabling at least two computer applications to communicate via a defined interface. An example of such a defined interface over the internet follows the "RESTful" framework which follows the "Representational State Transfer" architectural style, although many other API architectural styles exist. In an example, REST APIs are implemented using the HTTP protocol. In a REST API implemented over HTTP, URLs (Uniform Resource Locators) are used by a requesting application to request REST resources. Media types specify the format of data in REST requests and responses. Typical REST representations are JSON, HTML, and XML although a wide range of REST representations may be used. REST "Methods" exploits built-in HTTP methods such as "GET", "POST", "PUT", "DELETE" to implement REST actions. Methods are called using URLs and represent data using one or more media types. SOAP (Simple Object Access Protocol) is another web-based API protocol.

As the hardware performance of microcontrollers and embedded computers improves, embedded HTTP servers are increasingly being provided in items as simple as actuators, sensors, and media units in vehicles, to facilitate configuration, maintenance, and normal operation, for example.

Systems that use APIs are subject to security vulnerabilities caused by bad actors attempting to force access to the API by making unauthorized function calls to an API from outside, or inside, the computer system hosting the API. Accordingly, computer systems incorporating API can be further improved.

SUMMARY

According to a first aspect of the present invention, a computer-implemented method for detecting anomalous activity in a computer system by monitoring at least one decoy application programming interface (API), comprising:
  detecting, in at least one decoy API hosted in a computer system, a function call to the at least one decoy API from an element of the computer system; and
  transmitting an intrusion message from the at least one decoy API to an intrusion detection system signifying that a function call to the at least one decoy API has been made.

Accordingly, given a system with an API based architecture, attacks on the system can be detected reliably using a small number of computational resources (as measured, in examples, by CPU cycles or memory consumption).

Existing intrusion detection systems typically operate by comparing whatever behaviour is observed (such as network traffic, operating system processes) to a permitted list describing the expected, benign behaviour, or a forbidden list defining the illegal behaviour. To perform such a comparison, present intrusion detection systems require substantial computational resources. In contrast, the decoy APIs discussed herein require low computational expenditure, because a forbidden interaction with a decoy API immediately indicates an intrusion, or at least a serious anomaly that must be investigated.

According to a second aspect of the present invention, a computer system is provided comprising a first processing node, a second processing node, and a communications network configured to communicatively couple the first and second processing nodes. The first processing node is configured to host an intrusion detection system, and the second processing node is configured to host at least one decoy API. The at least one decoy API is configured to detect a function call to the at least one decoy API from an element of the computer system, and to transmit an intrusion message from the at least one decoy API to an intrusion detection system signifying that a function call to the at least one decoy API has been made.

According to third aspect of the present invention, a computer program element is provided comprising machine readable instructions which, when loaded and executed by a processor, cause the processor to perform the method according to the first aspect, or its embodiments.

According to a fourth aspect of the present invention, a non-transitory computer readable medium is provided comprising the machine readable instructions the third aspect.

BRIEF DESCRIPTION OF THE DRAWINGS

Exemplary embodiments of the present invention are depicted in the figures, which are not to be construed as limiting the scope of the present invention, and are explained in greater detail below.

DETAILED DESCRIPTION OF EXAMPLE EMBODIMENTS

Application Programming Interfaces provide a way for external elements of computer systems to obtain data generated or organized by another element of a computer system. For example, "AppLink™" technology permits mobile apps on a smartphone to interact with the human machine interface (HMI) of a vehicle, such as steering wheel controls. API connected systems may curate, on a vehicle, or on a cloud server, databases of vehicle functional data, for selective release over the internet to registered car mechanics, for example. An example of this is "Mobility as a Service" systems such as the "CarData™" platform. Application Programming Interfaces are experiencing increasing application in the field of industrial automation, to enable the monitoring and even control of industrial machinery.

The present invention is in the field of intrusion detection systems. Intrusion detection may be applied to embedded systems, for example such as may be found in the automotive or industrial context. A large number of future embedded, edge, and cloud IT systems rely on an API-based architecture. One way to perform intrusion detection is via deep packet inspection-based parsing of incoming requests (function calls) to an API and outgoing data returned by the API in response to a function call. However, such an approach is time consuming, computer-intensive, and requires specific knowledge of the APIs under monitoring.

The disclosure herein provides to detect an attack attempt using at least one fake API in a computer system with high precision, and a zero, or close to zero, false positive rate.

According to a first aspect of the present invention, there is provided a computer-implemented method 10 for detecting anomalous activity in a computer system by monitoring at least one decoy application programming interface D-API. The method comprises:

detecting 12, in at least one decoy API hosted in a computer system 16a, 16b, 16c, a function call to the at least one decoy API from an element of the computer system; and transmitting 14 an intrusion message INT from the at least one decoy API to an intrusion detection system IDS signifying that a function call F to the at least one decoy API has been made.

Figure 1:
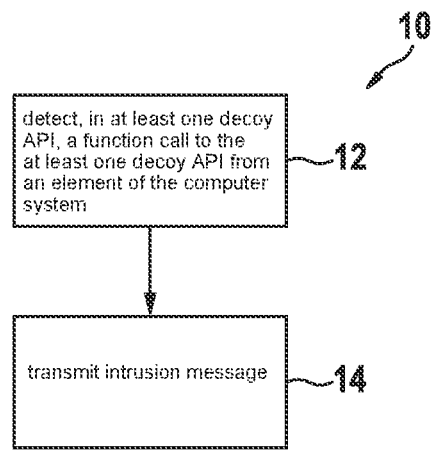
FIG. 1 schematically illustrates an example method according to the first aspect of the present invention.

FIG. 1 schematically illustrates method according to the first aspect of the present invention.

Accordingly, it is provided to add at least one decoy API D-API to a computer system 16a-c. During an intrusion detection attempt, an intruder attempts to map the inside of a computer system. In an internet-connected system, the intruder may perform a series of port scans on network addresses, for example. In the case of API-based penetration attempts, an intruder may identify a target API and attack it using speculative or template function calls. This specification proposes that when an intruder makes a forbidden function call to a decoy API, the decoy API informs a monitoring process of the Intrusion Detection Service IDS, thereby revealing the intrusion attempt to a monitoring process or individual.

The effectiveness of this approach arises, for example, because legitimate applications would never make a function call, or any other interaction, to the decoy API D-API.

According to an embodiment of the present invention, there is provided a step of outputting, from the intrusion detection system, the intrusion message, and/or triggering the transmission of a message indicating that the computer system 16 has been attacked. In an example, the output or transmission may be stored in a database internal to the Intrusion Detection System. In an example, the output or transmission may be provided to a remote monitoring centre. In an example, the output or transmission may be provided as one or more of a mobile phone alert, text message, voice mail, email alert, and the like to communications equipment of a monitoring engineer. In an example, the output or transmission may generate a ticket in a security monitoring system, optionally with a fingerprint of the technical status of the computer system 16, to facilitate debugging.

Figure 2:
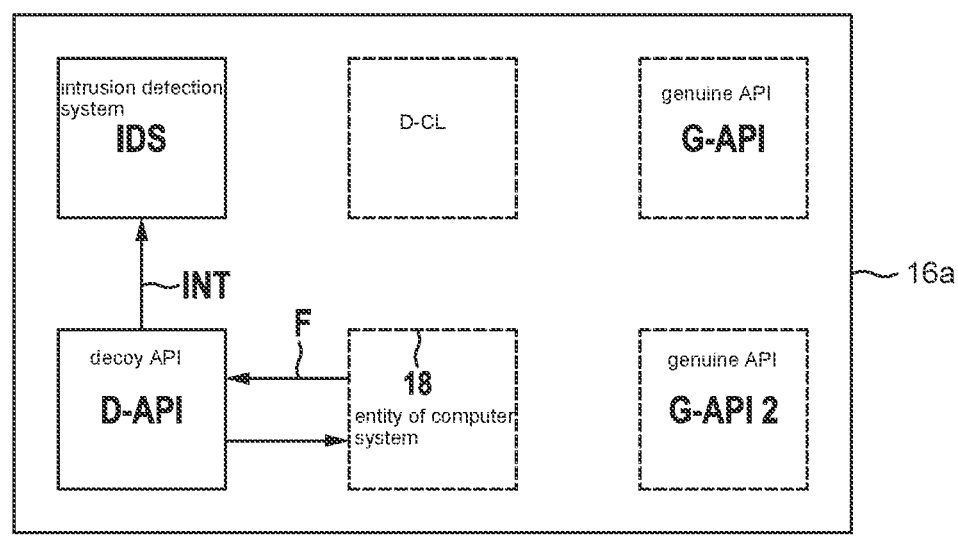
FIG. 2 schematically illustrates a computer system according to an example embodiment of the present invention.

FIG. 2 schematically illustrates a computer system according to an example.

In FIG. 2, a computer system 16a comprises G-API1 and G-API2, which are legitimate APIs that implement generic functionality of use to the computer system, in context. A non limiting example is that, in an automotive embedded system, G-API1 may be an interface to a tachometer, and G-API2 may be an interface to a speed database. G-API2 may make repeated function calls to G-API1 in order to record speed details from the tachometer in the database of G-API2, to build up a usage profile of the vehicle for maintenance purposes.

In contrast, D-API is at least one decoy API for detecting intrusions. During an attack phase, an attacker would not know the exact architecture of the target system. A prepatory step for an attack is, thus, to build up awareness of the architecture of the computer system 16a by invoking all accessible components of the system, such as the functional interfaces of G-API1, G-API2, but also D-API. As soon as D-API detects that a functional call has been made to its interface (by any entity 18 of the computer system 16a), the decoy API signals to the Intrusion Detection System that the computer system has been compromised. A decoy API may be lightly scripted, thus adding little computational overhead to the computer system 16a, b, c.

According to an embodiment, the method further comprises:

establishing at least one decoy client D-CL in the computer system 16a, 16b, 16c;

at the at least one decoy client, performing a first decoy function call from the decoy client to the at least one decoy API, and corresponding second decoy function call to the intrusion detection system; and at the at least one decoy API D-API, upon receiving the decoy function call, returning a decoy response to the at least one decoy client.

Figure 3:
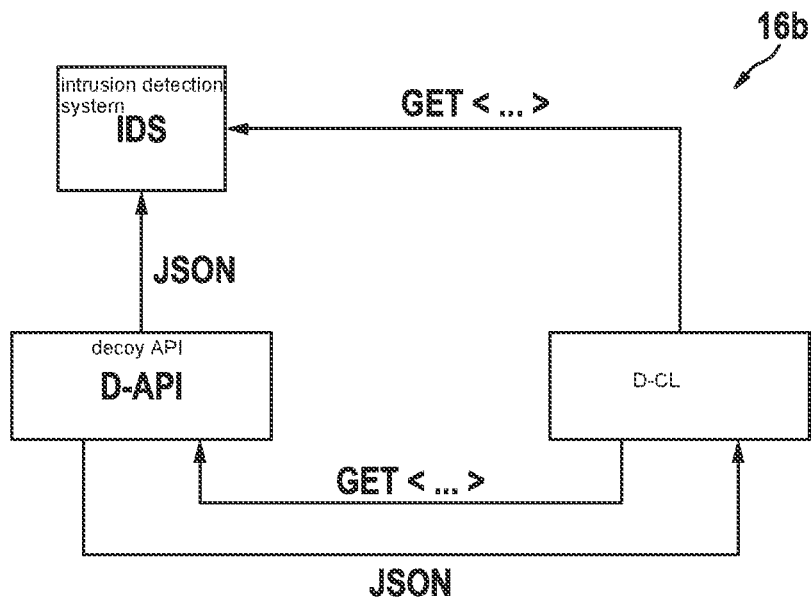
FIG. 3 schematically illustrates a computer system according to another example embodiment of the present invention.

FIG. 3 schematically illustrates a computer system according to the embodiment of the preceding paragraph.

According to the example of FIG. 3, the computer system 16b further comprises at least one decoy client D-CL. The decoy client may be lightly scripted, thus adding little computational overhead to the computer system 16a, b, c. The scenario of computer system 16b concerns a RESTful architecture using HTTP requests, although a skilled person will appreciate that the concept of using decoy clients is not so limited, and is broadly applicable to many types of API architecture.

In the example of FIG. 3, the at least one decoy client D-CL performs a function call to the at least one decoy API D-API. In this example, the function call is an HTTP GET < > request. The at least one decoy client D-CL may thus be considered to perform a fake function call to the at least one decoy API D-API. In an embodiment, the at least one decoy API D-API is configured, upon receiving the decoy function call, to return a decoy response to the at least one decoy client D-CL. In an embodiment, the at least one decoy API D-API is configured, upon receiving the decoy function call, to return a decoy JSON response to the at least one decoy client D-CL.

An attacker observing the computer system 16b would not be able to tell the difference between the decoy API and a genuine API. In practice, the attacker would need to perform deep packet inspection on traffic between the decoy client C-CL and the decoy API D-API by decoding one, or both, of the function call (in this example, the HTTP GET < > request) and/or the response (In this case, the JSON response). Furthermore, the attacker would need to know the expected behaviours of all other clients and APIs in the system in order to isolate the presence of a decoy API D-API.

According to an embodiment of the present invention, the method further comprises:
- at the intrusion detection system, receiving the intrusion message from the at least one decoy API (D-API) and the second decoy function call from the at least one decoy client; and
- determining that the function call to the at least one decoy API originated from the at least one decoy client based on the reception of the corresponding second decoy function call to the intrusion detection system, to thus classify the intrusion message triggered by the first decoy function call as a false positive.

According to the embodiment of the foregoing paragraph, the decoy client D-CL may send each function call (request) to at least the decoy API, and the intrusion detection system IDS. In an embodiment (not illustrated), the intrusion message received at the intrusion detection system IDS from the at least one decoy API D-API may be the original function call from the decoy client D-CL, passed through to the IDS with no changes. In an embodiment, the intrusion message received at the intrusion detection system IDS from the at least one decoy API D-API may be the response of the at least one decoy API to the original function call from the decoy client D-CL. In an embodiment (not illustrated), the intrusion message received at the intrusion detection system IDS from the at least one decoy API D-API may comprise both the original function call from the decoy client D-CL and the response of the at least one decoy API to the original function call.

According to an embodiment, determining, at the intrusion detection system, that the function call to the at least one decoy API D-API originated from the at least one decoy client further comprises i) comparing an element of the second decoy function call with an element of the intrusion message. For example, the resource in the original function call of the decoy client may be compared to the request received from the decoy API.

According to an embodiment, determining, at the intrusion detection system, that the function call to the at least one decoy API D-API originated from the at least one decoy client further comprises ii) comparing the arrival time of the second decoy function call and the intrusion message.

According to an embodiment, determining, at the intrusion detection system, that the function call to the at least one decoy API D-API originated from the at least one decoy client further comprises iii) verifying a hash function at the intrusion detection system using the second decoy function call and the intrusion message.

According to an embodiment, determining, at the intrusion detection system, that the function call to the at least one decoy API D-API originated from the at least one decoy client further comprises iv) verifying that the arrival time of the second decoy function call and the intrusion message are lower than a predetermined time interval apart.

According to embodiment, one, or any combination, of options i)-iv) listed above may be used. If the determination according to one of the examples of options i)-iv) above is successful, the IDS can assume that the decoy client D-CL issued a function call (request) to the decoy API D-API, and the decoy API D-API responded with a fake response to the function call (request). If the determination at the IDS according to one or more of steps i)-iv) fails, the IDS can determine that another entity active in the computer system 16b, such as an attacker, has interacted with the decoy API D-API, thus revealing the presence of an attacker with a high likelihood. On the other hand, an attacker observing interactions of the decoy client D-CL and the decoy API D-API cannot tell whether the interactions are genuine, or due to an intrusion detection process.

According to an embodiment, transmitting the first decoy function call from the decoy client to the at least one decoy API D-API comprises transmitting a first HTTP GET request. According to an embodiment, transmitting the second decoy function call from the at least one decoy client to the intrusion detection system comprises transmitting a second HTTP GET request. According to an embodiment, transmitting the intrusion message from the at least one decoy API to an intrusion detection system comprises transmitting a first JSON object or a first third HTTP GET request.

According to an embodiment, the computer-implemented method 10 further comprises:
- instantiating a system monitor in the computer system; and
- at the system monitor, maintaining a count of genuine APIs G-API1, G-API2 hosted in the computer system, and spawning at least one further decoy API in the computer system based on the count of genuine APIs hosted in the computer system to maintain a predetermined ratio between the count of genuine APIs and decoy APIs in the computer system.

According to an embodiment, the computer-implemented method further comprises:
- instantiating a decoy API controller in the computer system, wherein the decoy API controller is configured to spawn and/or delete one or more decoy APIs.

According to an embodiment, the computer-implemented method further comprises:
- receiving, at the decoy API controller, a threat indication; and
- spawning and/or deleting the at least one decoy API in the computer system based on the threat indication.

A system monitor operating in the computer system 16a, 16b according to previous embodiments allows adjustment of the security level either at design time (static) or at run-time (dynamic). For example, the system monitor may be an application or process of an embedded computer system communicably coupled to the computer system 16a, b, c. The adjustment of the security level may enable a greater or smaller number of decoy APIs to be spawned based on the threat environment. In an embodiment, the predetermined ratio between the count of genuine APIs and decoy APIs in the computer system is dynamically adjustable based on a figure of merit defining the threat environment obtained from a remote monitoring centre. In an embodiment, the predetermined ratio between the count of genuine APIs and decoy APIs in the computer system is dynamically adjustable based on a figure of merit based on the energy efficiency of the hardware hosting the computer system 16a-c. For example, as one or more edge compute devices are made accessible to the computer system 16a-c, the number of decoy APIs may be increased by a factor. This makes an attacker more likely to interact with a decoy API D-API. In an example, the number of decoy APIs may be determined according to a random number between predetermined end points.

According to an embodiment, the computer-implemented method further comprises:
- receiving, at the decoy API controller, an override command from a remote security operations centre; and spawning and/or deleting the at least one decoy API in the computer system based on the override command.

According to an embodiment, the computer-implemented method further comprises:
receiving one or more external environment signals at the decoy API controller; and
spawning and/or deleting one or more decoy APIs in the computer system based on the one or more external environment signals.

According to an embodiment, one or more external environment signals comprises one, or a combination, of an accelerometer, a motor control signal, a gyroscope signal, a coordinate obtained by a Global Navigation Satellite System (GNSS) system, a wireless or wired communications signal, or a digital probe comprised in a genuine API.

For example, the one or more external environment signals may comprise one, or a combination, of GPS coordinates of a vehicle, vehicle velocity, braking or gear status of a vehicle, or the status of a vehicle infotainment system. The computer system 16a, b, c may, thus, vary the configuration of decoy APIs based on the external environment signals. In an example, if the decoy API controller determines that a vehicle comprising the computer system 16a, b, c is driving on a commuter route to the office of a vehicle occupant, the decoy API controller determine may automatically spawn a plurality of decoy APIs of a first type, such as decoy APIs appearing to be associated with a car infotainment system. In an example, if the decoy API controller determines that a vehicle comprising the computer system 16a, b, c is driving on a recreational route (for example, to a holiday location) the decoy API controller determine may automatically spawn a plurality of decoy APIs of a second type, such as decoy APIs appearing to be associated with an in-car GPS mapping system.

In an example, the decoy API controller may spawn additional decoy APIs as extra Docker™ instances. This allows the system to dynamically adapt to a predetermined, or detected threat level. Alternatively, the number of decoy APIs and/or decoy clients may be adjusted from an edge-based or cloud-based backend such as a security operations centre. In this case, a human security analyst would monitor the relevant threat landscape and decide how to adjust the security level of the target system. Furthermore, the human security analyst could be substituted, or assisted, by an automatic remote monitoring system based on applying a machine learning model to the external environment signals, for example, and generating or deleting spawned decoy APIs as automatically determined by the machine learning model.

According to an embodiment, the computer-implemented method further comprises:
instantiating a genuine API G-API in the computer system, wherein the genuine API comprises an input argument set comprising a first subset of permitted inputs, and a second subset of forbidden inputs;
receiving, at the genuine API, a function call;
copying the function call to the genuine API to the intrusion detection system; and
if the function call to the genuine API comprises arguments entirely within the first subset of permitted inputs, performing no action at the intrusion detection system; or if the function call to the genuine API comprises an argument in the second subset of forbidden inputs, denoting that an intrusion has occurred.

Figure 4:
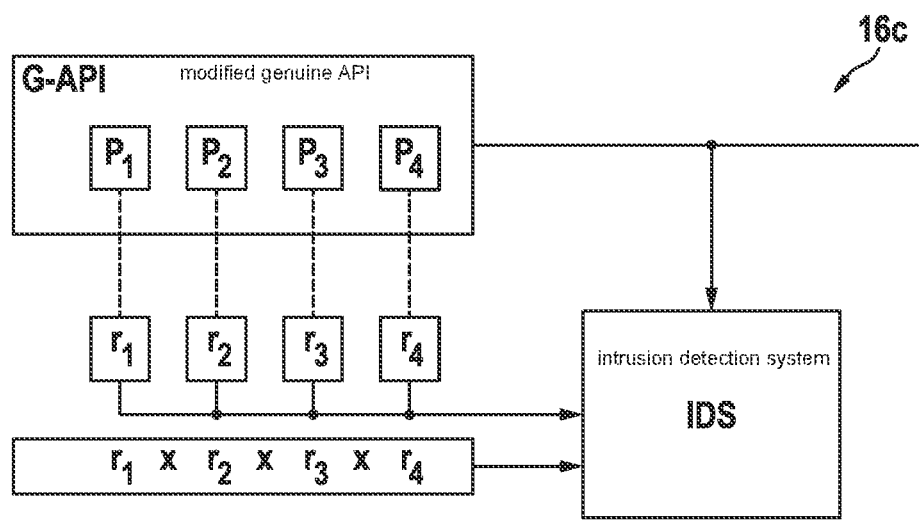
FIG. 4 schematically illustrates a computer system according to a further example embodiment of the present invention.

FIG. 4 schematically illustrates another communications process on a service-oriented communication system. For example, the modified genuine API G-API of FIG. 4 comprises four input parameters $p_1$-$p_4$. These parameters can be numbers, strings, or elements from arbitrary finite sets. Each of the parameters has its associated range $r_i$. of legitimate inputs. In the case of a finite set, $r_i$ is also a finite set). In this embodiment, legitimate inputs are inputs are inputs that a benign application making a function call (request) to the modified genuine API G-API would be expected to use.

Alternatively, or in addition, the IDS may be provided with a set of combinations of legitimate inputs $r_1 \times r_2 \times r_3 \times r_4$. The IDS module may, thus, receive the specific input parameters and their values each time a call to the genuine API G-API of computer system 16c is made.

Therefore, the modified genuine API G-API of computer system 16c is a functional API that performs a useful (non-security related) function in the computer system 16c. However, its inputs are monitored by the IDS to detect unexpected input combinations that may denote the presence of an intruder.

As a result, it is difficult for an attacker to distinguish a genuine API with attack detection capabilities (as described above) from a normal API. However, in contrast to the decoy APIs D-API discussed in FIGS. 1-3, the modified G-API of FIG. 4 accepts specific input values or ranges. In another embodiment, the modified G-API of FIG. 4 accepts a combination of input values or ranges that would never be used by a legitimate application. If an attacker invokes a modified genuine API G-API according to the present embodiment with any input values in a forbidden range, the IDS will be informed. In an embodiment, the forbidden range function may vary based on one or more of the external environment signals presented above, and/or on the threat level.

According to a second aspect, there is provided a computer system 16a, 16b, 16c. The computer system 16a, 16b, 16c comprises a first processing node, a second processing node; and a communications network configured to communicatively couple the first and second processing nodes. The first processing node is configured to host an intrusion detection system IDS, and the second processing node is configured to host at least one decoy D-API. The at least one decoy API is configured to detect a function call to the at least one decoy API from an element of the computer system, and to transmit an intrusion message from the at least one decoy API to an intrusion detection system signifying that a function call to the at least one decoy API has been made.

According to an embodiment, the at least one decoy API is configured to mimic an API offered by an embedded server of an electronic control unit, a vehicular telematics service, an engine control unit, a vehicle to vehicle communication module, a vehicle infotainment system, an antilock braking system, a navigation system, a transmission control unit, a keyless entry module, an airbag control unit, an OBD-II communication gateway, an anti-theft system, or a USB or serial gateway.

According to third aspect, there is provided a computer program element comprising machine readable instructions which, when loaded and executed by a processor, cause the processor to perform the method according to the first aspect, or its embodiments.

According to a fourth aspect, there is provided a non-transitory computer readable medium comprising the machine readable instructions according to the third aspect.

Computer implementations based on the foregoing embodiments may be implemented using a wide variety of software approaches. Programs, program modules, scripts, functions, and the like can be designed in languages such as Javascript, C++ or C, Java, PHP, RUBY, PYTHON, or other languages.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, the signal may be communicated over a data communication network such as the Internet as a download, or software update, for example.

The examples provided in the figures and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for detecting anomalous activity in a computer system by monitoring at least one decoy application programming interface, comprising the following steps:
    detecting, in at least one decoy API hosted in a computer system, a function call to the at least one decoy API from an element of the computer system; and
    transmitting an intrusion message from the at least one decoy API to an intrusion detection system signifying that a function call to the at least one decoy API has been made;
    instantiating a decoy API controller in the computer system, wherein the decoy API controller is configured to spawn and/or delete one or more decoy APIs;
    receiving one or more external environment signals at the decoy API controller; and
    spawning and/or deleting the one or more decoy APIs in the computer system based on the one or more external environment signals.

2. The computer-implemented method of claim 1, further comprising the following steps:
    establishing at least one decoy client in the computer system;
    performing, at the at least one decoy client, a first decoy function call from the decoy client to the at least one decoy API, and a corresponding second decoy function call to the intrusion detection system; and
    returning, at the at least one decoy API, upon receiving the decoy function call, a decoy response to the at least one decoy client.

3. The computer-implemented method of claim 2, further comprising the following steps:
    receiving, at the intrusion detection system, the intrusion message from the at least one decoy API and the second decoy function call from the at least one decoy client; and
    determining that the function call to the at least one decoy API originated from the at least one decoy client based on the reception of the corresponding second decoy function call to the intrusion detection system, to thus classify the intrusion message triggered by the first decoy function call as a false positive.

4. The computer-implemented method of claim 3, wherein the determining, at the intrusion detection system, that the function call to the at least one decoy API originated from the at least one decoy client based on the reception of the corresponding second decoy function call to the intrusion detection system further includes one of:
    i) comparing an element of the second decoy function call with an element of the intrusion message; or
    ii) comparing an arrival time of the second decoy function call and the intrusion message; or
    iii) verifying a hash function at the intrusion detection system using the second decoy function call and the intrusion message; or
    iv) verifying that the arrival time of the second decoy function call and the intrusion message are lower than a predetermined time interval apart.

5. The computer implemented method according to claim 2, wherein:
    the transmitting of the first decoy function call from the decoy client to the at least one decoy API includes transmitting a first HTTP GET request; and/or
    the transmitting of the second decoy function call from the at least one decoy client to the intrusion detection system includes transmitting a second HTTP GET request; and/or
    the transmitting of the intrusion message from the at least one decoy API to the intrusion detection system includes transmitting a first JSON object or a first third HTTP GET request.

6. The computer-implemented method according to claim 1, further comprising the following steps:
    instantiating a system monitor in the computer system; and
    maintaining, at the system monitor, maintaining a count of genuine APIs hosted in the computer system, and spawning at least one further decoy API in the computer system based on the count of genuine APIs hosted in the computer system to maintain a predetermined ratio between the count of genuine APIs and decoy APIs in the computer system.

7. The computer-implemented method according to claim 1, further comprising the following steps:
    receiving, at the decoy API controller, a threat indication; and
    spawning and/or deleting the at least one decoy API in the computer system based on the threat indication.

8. The computer-implemented method according to claim 1, wherein the one or more external environment signals include one, or a combination, of: an accelerometer, or a motor control signal, or a gyroscope signal, or a coordinate obtained by a Global Navigation Satellite System (GNSS) system, or a wireless or wired communications signal, or a digital probe comprised in a genuine API.

9. The computer-implemented method according to claim 1, further comprising the following steps:
    instantiating a genuine API in the computer system, wherein the genuine API includes an input argument set comprising a first subset of permitted inputs, and a second subset of forbidden inputs;
    receiving, at the genuine API, a function call;
    copying the function call to the genuine API to the intrusion detection system; and
    when the function call to the genuine API includes arguments entirely within the first subset of permitted inputs, performing no action at the intrusion detection system; and when the function call to the genuine API includes an argument in the second subset of forbidden inputs, denoting that an intrusion has occurred.

10. A computer-implemented method for detecting anomalous activity in a computer system by monitoring at least one decoy application programming interface, comprising the following steps:
   detecting, in at least one decoy API hosted in a computer system, a function call to the at least one decoy API from an element of the computer system; and
   transmitting an intrusion message from the at least one decoy API to an intrusion detection system signifying that a function call to the at least one decoy API has been made;
   instantiating a decoy API controller in the computer system, wherein the decoy API controller is configured to spawn and/or delete one or more decoy APIs;
   receiving, at the decoy API controller, a threat indication; and
   spawning and/or deleting the one or more decoy APIs in the computer system based on the threat indication
   receiving, at the decoy API controller, an override command from a remote security operations center; and
   spawning and/or deleting the one or more decoy APIs in the computer system based on the override command.

11. A computer system, comprising:
   a first processing node;
   a second processing node; and
   a communications network configured to communicatively couple the first and second processing nodes;
   wherein the first processing node is configured to host an intrusion detection system, and the second processing node is configured to host at least one decoy;
   wherein the at least one decoy API is configured to detect a function call to the at least one decoy API from an element of the computer system, and to transmit an intrusion message from the at least one decoy API to an intrusion detection system signifying that a function call to the at least one decoy API has been made;
   wherein a decoy API controller in the computer system is instantiated, wherein the decoy API controller is configured to spawn and/or delete one or more decoy APIs;
   wherein one or more external environment signals is received at the decoy API controller; and
   wherein the one or more decoy APIs is spawned and/or deleted in the computer system based on the one or more external environment signals.

12. A non-transitory computer readable medium on which is stored a computer program including machine readable instructions for detecting anomalous activity in a computer system by monitoring at least one decoy application programming interface, the instructions, when executed by a computer processing node, causing the computer processing node to perform the following steps:
   detecting, in at least one decoy API hosted in a computer system, a function call to the at least one decoy API from an element of the computer system; and
   transmitting an intrusion message from the at least one decoy API to an intrusion detection system signifying that a function call to the at least one decoy API has been made;
   instantiating a decoy API controller in the computer system, wherein the decoy API controller is configured to spawn and/or delete one or more decoy APIs;
   receiving one or more external environment signals at the decoy API controller; and
   spawning and/or deleting the one or more decoy APIs in the computer system based on the one or more external environment signals.

* * * * *